United States Patent
Li et al.

(10) Patent No.: US 7,194,051 B2
(45) Date of Patent: Mar. 20, 2007

(54) FINGER MERGE PROTECTION FOR RAKE RECEIVERS

(75) Inventors: Tao Li, San Diego, CA (US); Chandra Ramabhadra Murthy, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 899 days.

(21) Appl. No.: 10/233,047

(22) Filed: Aug. 30, 2002

(65) Prior Publication Data

US 2003/0235239 A1 Dec. 25, 2003

Related U.S. Application Data

(60) Provisional application No. 60/389,091, filed on Jun. 13, 2002.

(51) Int. Cl.
*H04B 1/10* (2006.01)
(52) U.S. Cl. .................................................. 375/349
(58) Field of Classification Search ................ 375/349, 375/347, 140, 145, 147, 149; 370/335, 342
See application file for complete search history.

(56) References Cited

U.S. PATENT DOCUMENTS

| | | | |
|---|---|---|---|
| 5,978,423 A | 11/1999 | Farjh | 375/347 |
| 6,078,611 A | 6/2000 | La Rosa et al. | 375/206 |
| 6,377,614 B1 | 4/2002 | Yamashita | 375/149 |
| 6,748,013 B2 * | 6/2004 | Reznik et al. | 375/148 |
| 2003/0161390 A1 * | 8/2003 | Teague et al. | 375/148 |

FOREIGN PATENT DOCUMENTS

EP 0896438 A1 2/1999

* cited by examiner

*Primary Examiner*—Khai Tran
(74) *Attorney, Agent, or Firm*—Philip Wadsworth; Charles D. Brown; George C. Pappas

(57) ABSTRACT

Techniques to prevent fingers from merging. For each update command to adjust the timing of a particular "target" finger, a list of "candidate" fingers for which merging is to be prevented is determined. Detection for merging is then performed for each candidate finger, e.g., one at a time. For each candidate finger, a comparison is performed using the position of the target finger, the position of the candidate finger, and a merge threshold. A determination is then made whether merging is detected for the candidate finger based on the comparison result. The update command may be disallowed for the target finger if merging is detected for any candidate finger, and may be allowed if merging is not detected for all candidate fingers. A "preferred" target finger may be allowed to be adjusted even if merging is detected for a non-preferred candidate finger, which may be moved instead.

27 Claims, 6 Drawing Sheets

FINGER MERGE PROTECTION FOR RAKE RECEIVERS

RELATED APPLICATIONS

This application claims priority to U.S. Provisional Application No. 60/389,091, filed on Jun. 13, 2002.

BACKGROUND

1. Field

The present invention relates generally to data communication, and more specifically to techniques for protecting against merging of demodulation elements (or fingers) assigned to process multipath components of a received signal in a wireless communication system.

2. Background

In a wireless communication system, a modulated signal transmitted from a transmitter may reach a receiver via a number of signal paths due to artifacts in the propagation environment (e.g., building, natural structures, and so on). The received signal at the receiver may thus include a number of multipath components, each of which corresponds to a signal instance received via a particular signal path. Since the receiver may also receive signals from multiple transmitters, the received signal may include a number of multipath components for a number of transmitters.

For a CDMA system, a rake receiver is often used to concurrently process a number of multipath components in the received signal. The rake receiver normally includes one or more searcher elements (or simply "searchers") and a number of demodulation elements (often referred to as "fingers"). Each searcher may be operated to process the received signal to search for strong multipath components. Each finger may then be assigned to process a particular multipath component of sufficient strength. By assigning multiple fingers to process a number of multipath components and then combining symbol estimates from all assigned fingers, more of the energy in the received signal may be collected and improved performance may be achieved.

Each multipath component is associated with a particular propagation delay and a particular time of arrival at the receiver, both of which are determined by the signal path. For a wireless communication channel, and especially for a mobile environment, the signal paths may continually change over time. Thus, as part of the signal processing, a time tracking loop is normally maintained for each active finger and used to track the timing of the multipath component assigned to the finger. Each time tracking loop would advance or retard its timing, as necessary, so that it remains locked to the changing arrival time of the assigned multipath component.

As the signal paths change, the arrival times of two or more multipath components may approach close to each other. When the difference between the arrival times of the multipath components is equal to or less than a particular threshold, the multipath components appear as an energy "blob" and the assigned fingers are not able to resolve them. Consequently, these fingers would end up tracking the same multipath component, a phenomenon often referred to as "finger merging". This merging effect is undesirable because the fingers would not be able to track the individual multipath components when the signal paths subsequently change and the multipath components move away from each other. Once merged, the fingers cannot be easily separated, and the benefits obtained by assigning these multiple fingers to process the received signal are lost.

There is therefore a need in the art for techniques to prevent the fingers of a rake receiver from merging together.

SUMMARY

Techniques are provided herein for performing finger merge protection in a manner to provide improved performance, especially when the multipath components are clustered close to one another (e.g., under "fat path" condition, which is described below). For each update command to adjust the timing of a particular "target" finger, a list of "candidate" fingers for which merging is to be prevented is determined. Detection for merging is then performed for each candidate finger, e.g., one at a time. For each candidate finger, a comparison is performed using the position of the target finger, the position of the candidate finger, and a merge threshold. The position of a finger is indicative of the arrival time of the multipath component being processed by that finger. A determination is then made whether merging is detected for the candidate finger based on the comparison result. Merging may be detected if the absolute difference between the positions of the target and candidate fingers is equal to or less than the merge threshold, which may be set to less than one PN chip. The update command may be disallowed for the target finger if merging is detected for any candidate finger, and may be allowed if merging is not detected for all candidate fingers.

Each active finger assigned to process a multipath component may also be classified as either a "preferred" or "non-preferred" finger. The preferred fingers may be those with stronger signal strength for their assigned multipath components. A target finger, if it is a preferred finger, may be allowed to be adjusted even if merging is detected for a non-preferred candidate finger, which may be moved instead.

Various aspects and embodiments of the invention are described in further detail below. The invention further provides devices, integrated circuits, methods, program codes, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
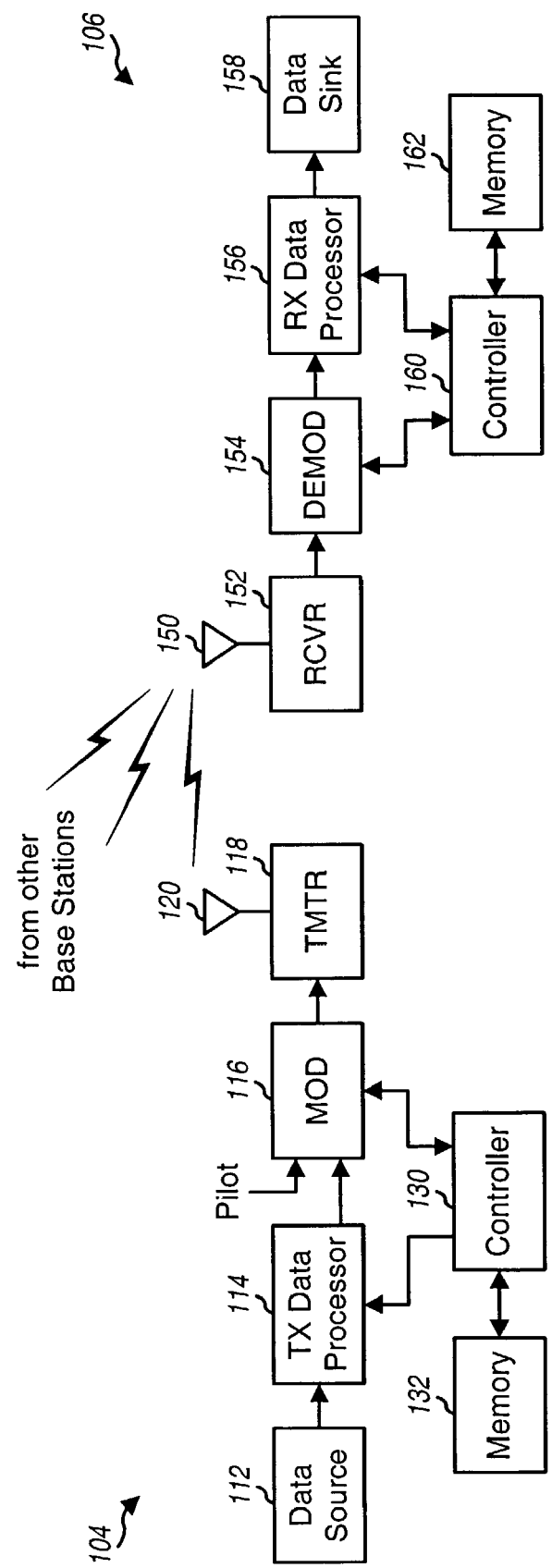
FIG. 1 is a diagram of a base station and a terminal in a wireless communication system.

FIG. 1 is a simplified block diagram of an embodiment of a base station 104 and a terminal 106 in a wireless communication system (e.g., a CDMA system). On the forward link, at base station 104, a transmit (TX) data processor 114 receives different types of traffic such as user-specific data from a data source 112, overhead data from a controller 130, and so on. TX data processor 114 formats and codes the data based on one or more coding schemes to provide coded data.

A modulator (MOD) 116 further processes the coded data from TX data processor 114 and pilot data to provide modulated data. For a CDMA system, modulator 116 "covers" the coded and pilot data with different channelization codes to channelize the user-specific data, overhead data, and pilot data onto their respective code channels. For a CDMA system, modulator 116 further spectrally spreads the channelized data with a (complex) pseudo-random number (PN) sequence having a particular offset assigned to the base station. The modulated data is then provided to a transmitter (TMTR) 118 and conditioned (e.g., converted to one or more analog signals, amplified, filtered, and frequency upconverted) to generate a modulated signal, which is then transmitted via an antenna 120 and over a wireless link to the terminals.

At terminal 106, the modulated signal is received by an antenna 150 and provided to a receiver unit (RCVR) 152 (which may also be referred to as a "front-end" unit). Receiver unit 152 conditions (e.g., filters, amplifies, and frequency downconverts) the received signal and further digitizes the conditioned signal to provide samples. A demodulator (DEMOD) 154 then processes the samples to provide demodulated data. Demodulator 154 may implement a rake receiver that can concurrently process a number of multipath components in the received signal, as described below.

A receive (RX) data processor 156 then decodes the demodulated data to recover the user-specific data and overhead data transmitted on the forward link. The processing by demodulator 154 and RX data processor 156 is complementary to that performed by modulator 116 and TX data processor 114, respectively, at base station 104.

Controllers 130 and 160 direct the operation at the base station and terminal, respectively. Memories 132 and 162 provide storage for program codes and data used by controllers 130 and 160, respectively.

The terminology used to describe the processing by modulator 116 at the base station and demodulator 154 at the terminal may be different for different CDMA standards. For W-CDMA, the channelization is referred to as "spreading" and the spectral spreading is referred to as "scrambling". The channelization codes for the "spreading" are orthogonal variable spreading factor (OVSF) codes, and the PN sequences for the "scrambling" are referred to as scrambling codes. For IS-95 and IS-2000, the channelization is referred to as "covering" and the spectral spreading is referred to as "spreading". The channelization codes for the "covering" are Walsh codes or quasi-orthogonal codes, and the PN sequences for the "spreading" are referred to as PN sequences.

The finger merge protection techniques described herein may be used for various. CDMA standards and designs. For clarity, these techniques are specifically described for W-CDMA.

Figure 2:
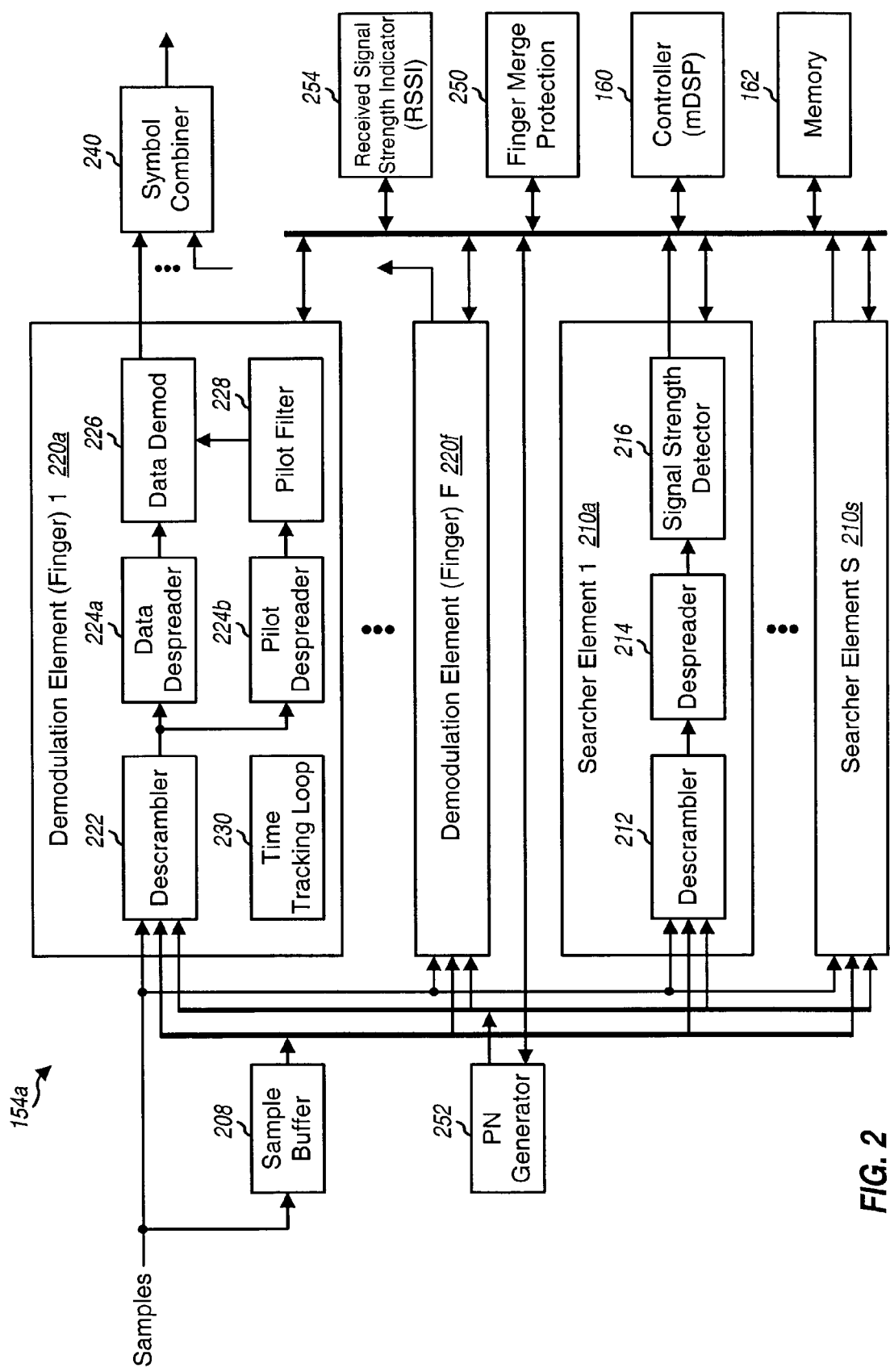
FIG. 2 is a block diagram of a rake receiver.

FIG. 2 is a block diagram of a demodulator 154a, which is one embodiment of demodulator 154 in FIG. 1. Demodulator 154a implements a rake receiver that includes S searcher elements 210 (or simply "searchers") and F demodulation elements 220 (or simply "fingers"), where S and F can each be any integer one or greater. Each searcher 210 may be used to search for strong multipath components in the received signal and to provide an indication of the strength and timing of each found multipath component that meets one or more criteria. Typically, each active searcher 210 searches for the pilots transmitted from the base stations to find these multipath components.

One finger 220 may then be assigned to process each multipath component of interest (e.g., as determined by controller 160 based on the signal strength and timing information provided by searchers 210). As used herein, an "active" finger is one that is assigned to process a particular multipath component. Each active finger processes its assigned multipath component to provide demodulated symbols for that multipath component. The demodulated symbols from all active fingers assigned to a particular data transmission may be combined to provide recovered symbols for that data transmission.

As shown in FIG. 2, the complex samples from receiver unit 152 may be provided directly to all active fingers 220 and to a sample buffer 208. Buffer 208 stores the samples for subsequent processing by searchers 210 and fingers 220, and provides the stored samples to each searcher and finger as they are needed. A PN generator 252 provides PN segments and PN sequences used by the searchers and fingers, respectively.

Each searcher 210 operates in conjunction with controller 160 and PN generator 252. For each active searcher 210, samples are retrieved (typically one segment at a time) from sample buffer 208 and provided to a descrambler 212, which also receives a complex PN segment with a specific phase corresponding to the hypothesis being evaluated. Descrambler 212 performs a complex multiply of the samples with the PN segment and provides complex descrambled samples. A despreader 214 then "despreads" the descrambled samples with a channelization code for the pilot (which is OVSF code of zero in W-CDMA) to provide pilot samples. A signal strength detector 216 estimates the signal strength of the pilot for the hypothesis being evaluated and provides the estimated signal strength to controller 160. A number of hypotheses is typically evaluated to search for multipath components, with each hypothesis corresponding to a particular arrival time and a corresponding PN phase. For any given hypothesis, the estimated signal strength would be high if there is a multipath component with that arrival time and would be low otherwise.

Within each active finger 220, the complex samples are provided to a descrambler 222, which also receives a complex PN sequence from PN generator 252. The PN sequence has a specific phase that is dependent on (1) the arrival time of the multipath component being processed by the finger and (2) the offset of the PN sequence used at the transmitter. This arrival time is initially determined by the searcher and is thereafter tracked by a time tracking loop 230 within the finger. Descrambler 222 performs a complex multiply of the samples with the PN sequence and provides descrambled samples, which are further despread by despreaders 224a and 224b with the channelization codes for the user-data and the pilot, respectively. The pilot samples from despreader 224b are further filtered by a pilot filter 228 to provide pilot estimate. A data demodulator 226 then demodulates the despread samples from despreader 224a with the pilot estimate to provide demodulated symbols for the assigned multipath component.

A symbol combiner 240 combines the demodulated symbols from all fingers that have been assigned to process a given data transmission. Symbol combiner 240 provides recovered symbols, which may further be decoded to recover the transmitted data. The design and operation of a rake receiver such as that shown in FIG. 2 is described in further detail in the U.S. Pat. Nos. 5,764,687 and 5,490,165, which are incorporated herein by reference.

Figure 3:
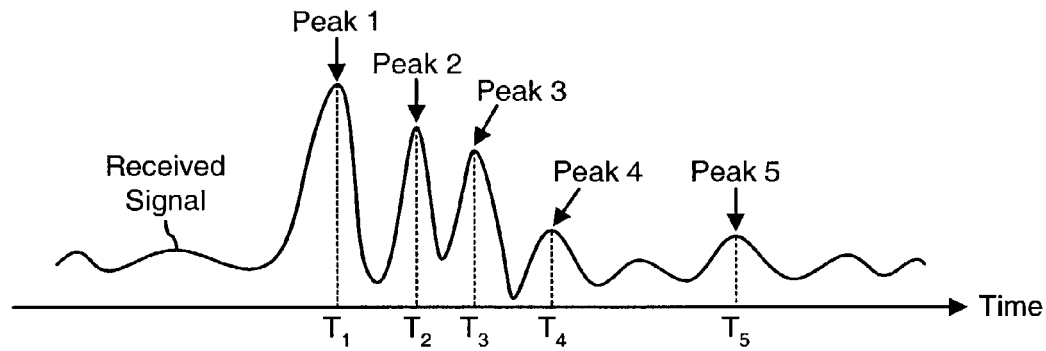
FIG. 3 shows an example received signal at the terminal.

FIG. 3 shows an example of a received signal at the terminal. The modulated signal transmitted from each base station may be received by the terminal via a number of signal paths. The received signal at the terminal may thus include a number of multipath components for one or more base stations. Each multipath component is associated with a particular amplitude and time of arrival at the terminal. In the example shown in FIG. 3, multipath components (or peaks) 1 through 5 are associated with arrival times $T_1$, through $T_5$, respectively. The profile of the multipath components in the received signal is determined by the wireless channel and typically varies over time. At any given moment, there may be multipath components clustered close to one another. A "fat path" condition would arise if there are two multipath components separated by less than one PN chip.

Fingers are assigned to process multipath components of sufficient strength found by the searcher. Each finger would track the timing (or arrival time) of its assigned multipath component as it moves about due to changes in the signal path. As each multipath component drifts in time, it may come close to or may even cross over one or more other multipath components. When the difference in arrival times (i.e., the distance) between two multipath components is less than a particular threshold (which is typically one PN chip for some rake receiver designs), the fingers are not able to resolve these individual multipath components. Consequently, the fingers would "merge" and end up tracking the same multipath component, which is typically the stronger of the two. When these multipath components drift apart again, the merged fingers would continue to track the stronger multipath component. Performance would then be degraded because the energy from the other multipath component is not collected.

A finger merge protection mechanism is used to detect when the multipath components drift too close to each other and to prevent their assigned fingers from merging. This mechanism ensures that a certain minimum distance is maintained between the timing of any two assigned fingers. For CDMA, the timing of each finger is normally defined by the phase of the PN sequence used to descramble the assigned multipath component, which is also referred to as the finger's "PN phase" or "PN position". If the difference between the PN positions of any two fingers is equal to or less than the threshold, then the finger merge protection mechanism would not allow these fingers to move towards each other but would allow them to move apart.

For clarity, the techniques for providing finger merge protection are described for a specific rake receiver design. In this design, the rake receiver includes 12 fingers and operates at a clock rate that is 8 times the PN chip rate (i.e., chip×8). The PN position for each finger may be updated as each update command is received or only at specific time instants (e.g., every 256-chip processing boundary).

Figure 4:
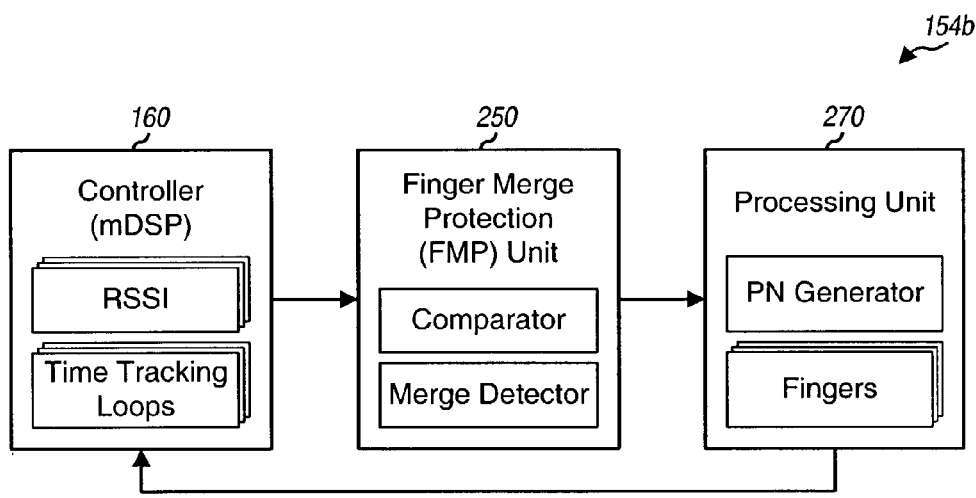
FIG. 4 shows one implementation of the rake receiver in FIG. 2.

FIG. 4 is a block diagram of a demodulator 154b, which is one implementation of the rake receiver shown in FIG. 2. In this embodiment, controller 160 (which may also be referred to as a modem digital signal processor (mDSP)) implements the time tracking loops for all of the active fingers.

For each active finger that is assigned to process a particular multipath component, the update commands to adjust the finger's PN position are provided by that finger's time tracking loop. In an embodiment, this adjustment is in the form of an advance in the PN position by a particular amount (e.g., −⅛ PN chip) or a retard of the PN position by another particular amount (e.g., +⅛ PN chip). The update commands are thus also referred to as advance/retard commands.

Controller 160 provides the advance/retard commands for the active fingers, one command at a time, to a finger merge protection (FMP) unit 250. For each advance/retard command issued by controller 160, FMP unit 250 determines whether or not the command is allowed for the finger, if finger merge protection is enabled. Processing unit 270 receives the allowed advance/retard commands from FMP unit 250 and updates the PN positions for the active fingers based on the received commands. Processing unit 270 includes all of the fingers 220 and PN generator 252.

Figure 5:
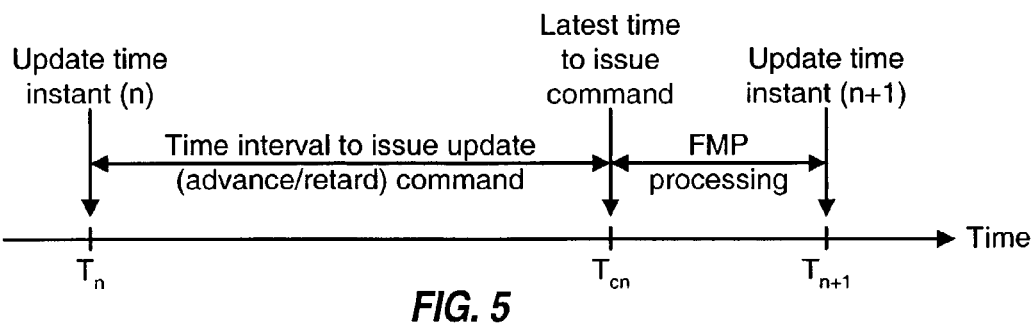
FIG. 5 shows a timeline for updating of the PN position for one finger.

FIG. 5 shows a timeline for the updating of the PN position for one active finger. In one embodiment, the PN position for each finger can be updated at specific time instants, which may be every 256-chip processing boundary. FMP unit 250 requires a certain amount of time to process an advance/retard command from controller 160. Thus, for update interval n, the advance/retard command would need to be provided to FMP unit 250 prior to time $T_{cn}$ for the command to take effect at the next update time instant $T_{n+1}$.

If FMP unit 250 requires 12 clock cycles to perform comparisons for the 12 fingers for each advance/retard command, as described below, then the advance/retard commands should not be issued faster than one command for each 12 clock cycles. Moreover, for a given advance/retard command to take effect at the next update time instant, it should be issued no later than 12 clock cycles before this time instant.

Figure 6:
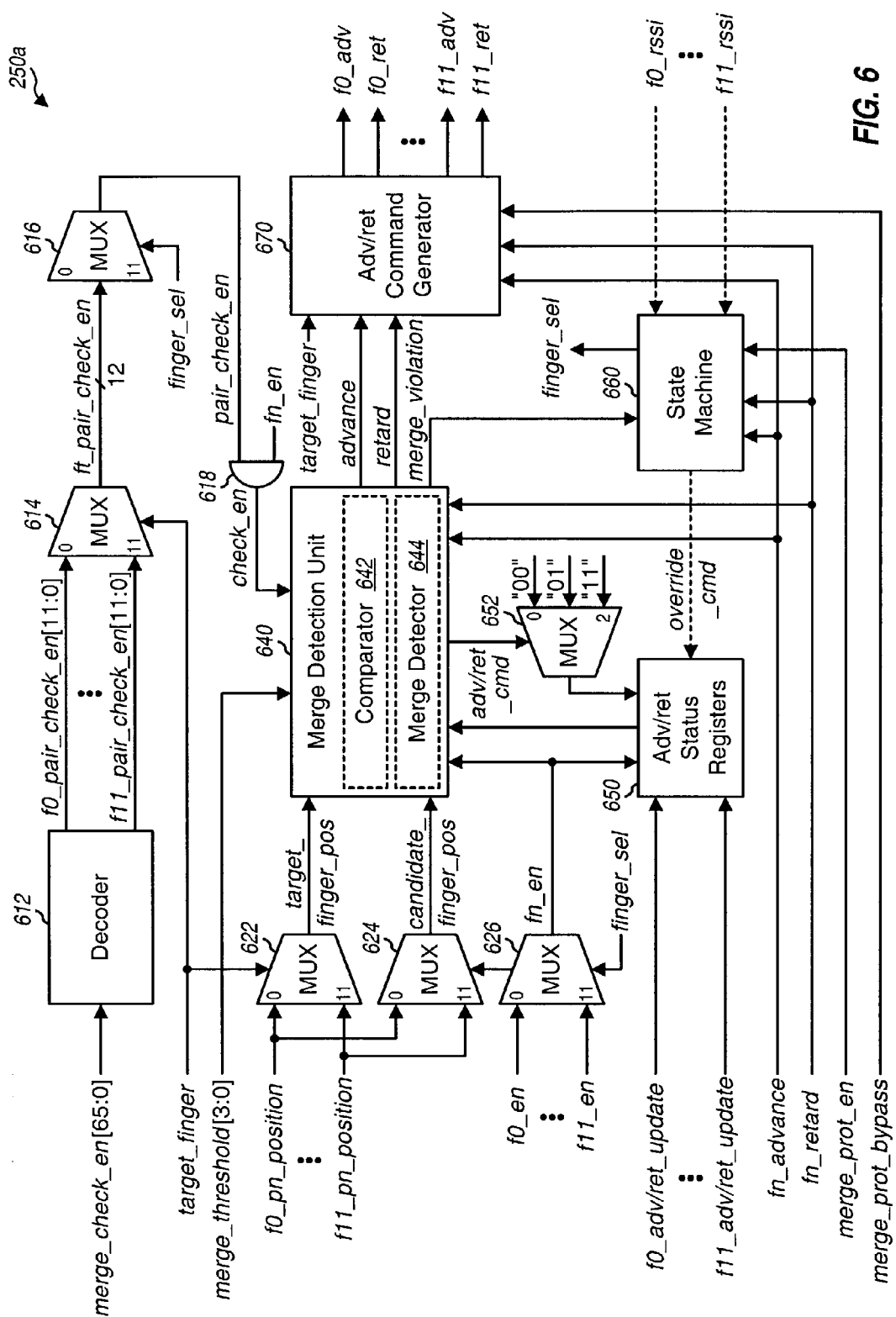
FIG. 6 is a block diagram of a finger merge protection (FMP) unit.

FIG. 6 is a block diagram of an FMP unit 250a, which is one embodiment of FMP unit 250 in FIGS. 2 and 4. FMP unit 250a receives a number of control signals and the advance/retard commands for all active fingers, determines whether or not these commands are allowed, and provides the allowed commands to processing unit 270. Table 1 lists the control signals provided to FMP unit 250a, for a specific embodiment.

TABLE 1

| Signal Name | Description |
| --- | --- |
| merge_prot_en | A 1-bit signal used to enable or disable the finger merge protection function for all fingers. |
| merge_prot_bypass | A 1-bit signal used to bypass the finger merge protection function. |
| merge_threshold[3:0] | A 4-bit threshold used to specify the minimum distance (in ⅛ chip resolution) between the PN positions of any two fingers. The minimum and maximum threshold values are 0 chip and 15/8 chips. |
| f0_en through f11_en | The 12 controls used to individually enable or disable each of the 12 fingers for comparison. |
| target_finger | A 4-bit control that indicates the specific finger for which the advance/retard command is issued. |
| merge_check_en[65:0] | A 66-bit value that indicates which finger pairs are to be compared for the finger merge protection. For 12 fingers, there are 66 possible finger pairs that may be compared. |

TABLE 1-continued

| Signal Name | Description |
| --- | --- |
| f0_pn_position through f11_pn_position | Provide the 12 current PN positions for the 12 fingers. |
| f0_adv/ret_update through f11_adv/ret_update | The 12 signals from the 12 fingers used to indicate that the through advance/retard commands have been applied (e.g., latched) by the fingers. |
| fn_advance | A strobe signal used to issue an advance command for the target finger. |
| fn_retard | A strobe signal used to issue a retard command for the target finger. |

Each unique pair of fingers is associated with a respective bit of the merge_check_en signal. Table 2 shows an example mapping between the 66 bits of the merge_check_en signal and the 66 possible finger pairs. A value of one ("1") for a given bit indicates that the associated finger pair is to be compared for the command. For example, if bit 13 is set to one, then fingers 1 and 4 are

TABLE 2

| | Finger | | | | | | |
| --- | --- | --- | --- | --- | --- | --- | --- |
| Finger | 0 | 1 | 2 | 3 | 4 | 5 ... | 11 |
| 0 | | bit 0 | bit 1 | bit 2 | bit 3 | bit 4 ... | bit 10 |
| 1 | | | bit 11 | bit 12 | bit 13 | bit 14 ... | bit 20 |
| 2 | | | | bit 21 | bit 22 | bit 23 ... | bit 29 |
| 3 | | | | | bit 30 | bit 31 ... | bit 37 |
| ↓ | | | | | | | ↓ |
| 10 | | | | | | | bit 65 |

Controller 160 issues the advance/retard command for one active finger at a time, and the PN position of this finger is compared against the PN positions of selected ones of the other active fingers. The active finger for which the advance/retard command has been issued is referred to as the "target finger". The current active finger to be compared against the target finger is referred to as the "candidate finger". Only fingers assigned to the same base station (or base transceiver system (BTS)) need to be compared for finger merge protection. This is because different base stations are assigned different PN offsets, and the signals from these base stations can be resolved by PN sequences with different offsets, even though they may have the same arrival times at the terminal.

In the embodiment shown in FIG. 6, a decoder 612 receives and decodes the merge_check_en signal signal to provide 12 comparison control signals for the 12 fingers, f0_pair_en through f11_pair_check_en. Each of the 12 fingers is associated with one comparison control signal. The comparison control signal for each finger includes 12 bits for the 12 fingers, with each bit indicating whether or not the finger associated with this bit is to be compared against the finger associated with the comparison control signal. As a specific example, if finger 0 is to be compared against fingers 2, 5, and 11, the bits 1, 4, and 10 of the merge_check_en signal would be set. The f0_pair_check_en signal for finger 0 would then be "001001000001", where the leftmost "1" corresponds to finger 2 and the rightmost "1" corresponds to finger 11. The f2_pair_check_en, f5_pair_check_en, and f11_pair_check_en signals for fingers 2, 5, and 11 may each be "100000000000" to indicate the comparison against finger 0. Any value may also be used for these signals since they would not be selected anyway by the target_finger signal.

A multiplexer (MUX) 614 receives the 12 comparison control signals and selects the one corresponding to the target finger, as determined by the target_finger signal. For the above example, the f0_pair_check_en signal for finger 0 would be selected, since it is the target finger. A multiplexer 616 then receives the comparison control signal for the target finger and provides one bit at a time based on finger_sel signal, which cycles through all 12 fingers as described below. For each advance/retard command, multiplexer 616 provides a sequence of 12 bits that indicates whether or not the finger associated with each of these bits should be compared against the target finger.

A multiplexer 626 receives the 12 enable signals for the 12 fingers, f0_en through f11_en, and provides one enable signal at a time based on the finger_sel signal. Each enable signal is set (e.g., to "1") if the associated finger is to be compared against the target finger. The enable signal for the target finger is always reset so that the target finger is not compared against itself. Regardless of which finger is the target finger, one of the bits in the comparison control signal for the target finger will correspond to the target finger itself. An AND gate 618 performs an AND of the output of multiplexer 616 with the output of multiplexer 626 to provide a check_en signal. For each advance/retard command, the check_en signal includes a sequence of 12 bits that indicates whether or not each of the 12 fingers is to be compared against the target finger.

A multiplexer 622 receives the 12 current PN positions for the 12 fingers, f0_pn_position through f11_pn_position, and provides the PN position for the target finger, which is referred to as the "target finger position". Again, the target finger is identified by the target_finger signal. Each of f0_pn_position through f11_pn_position includes a sufficient number of bits to specify the PN position for the associated finger. For W-CDMA with a PN sequence length of 38,400 and for a rake receiver running at 8 times the chip rate, 19 bits would provide sufficient range to cover 38,400×8. A multiplexer 624 receives the 12 current PN positions for the 12 fingers and provides the PN position for the candidate finger, which is referred to as the "candidate finger position". Multiplexer 624 is controlled by the finger_sel signal and cycles through the 12 PN positions for the 12 fingers.

Registers 650 stores the current advance/retard status for the 12 fingers, which indicate the advance/retard commands that have been allowed for the fingers but not yet applied. These advance/retard commands may be applied by the fingers at their next update time instants. In a specific embodiment, each finger may be advanced or retarded by ⅛ PN chip, if at all, for each update interval. Two bits may thus be used to store the advance/retard status for each finger. Table 3 lists the advance/retard commands, their status values, and the changes to the PN position.

TABLE 3

| Advance/retard value | Advance/retard command | PN position change |
| --- | --- | --- |
| "00" | no change | 0 |
| "01" | retard | +⅛ PN chip |
| "11" | advance | −⅛ PN chip |

The advance/retard status for each finger is reset to "00" whenever the corresponding advance/retard command is applied by the finger.

A merge detection unit 640 detects for merge violation for each advance/retard command. In an embodiment, to reduce hardware complexity, merge detection unit 640 includes only one comparator 642 that is used to compare the PN positions for the target and candidate fingers. The comparison may be performed in various manners.

In a first embodiment, each comparison is made using the target finger's current PN position (or simply, the "current target position") and the candidate finger's updated PN position at the next update time instant (or simply, the "updated candidate position"). The updated candidate position is equal to the candidate finger's current PN position plus its advance/retard status from registers 650. For this embodiment, an additional check is performed to determine whether or not the advance/retard command for the target finger would decrease this difference in PN positions. This embodiment, which is described in further detail below, requires one less adder since an updated PN position need not be computed for the target finger.

In a second embodiment, each comparison is made using the target finger's updated PN position at the next update time instant (or simply, the "updated target position") and the updated candidate position. The updated target position is equal to the target finger's current PN position plus the advance/retard command issued for the finger. For the second embodiment, the comparison is made using the updated PN positions that are to be applied at the next update time instant, with the assumption that the advance/retard command for the target finger will be allowed. The merge threshold for the second embodiment is smaller than that for the first embodiment because the command is reflected in the updated target position.

A merge detector 644 further processes the result of each comparison for a particular candidate finger to determine whether or not merge protection conditions have been violated with respect to this candidate finger (i.e., whether merging is detected for this finger). The determination for merge violation is described in detail below. If there is a merge violation with respect to any candidate finger, then a merge_violation signal is set and the comparison for any and all remaining fingers can be aborted. An adv/ret_cmd signal is also set such that a multiplexer 652 provides "00" for no change, which is then stored in the proper locations in register 650 for the target finger. Alternatively, if there is no merge violation with respect to the current candidate finger, then the merge_violation signal is not set and the comparison for the remaining fingers continues. If all 12 fingers have been cycled through and the merge_violation signal is still not set, then the adv/ret_cmd signal is set such that multiplexer 652 provides either "01" for retard or "11" for advance, as determined by the fn_advance and fn_retard signals. The value from multiplexer 652 is then stored in the proper locations in register 650 for the target finger. Merge detector 644 also provides the proper advance and retard signals for the target finger.

A generator 670 receives the advance and retard signals and generates the proper advance/retard command for the target finger. This command is then provided to the proper pair of output signals, fn_adv and fn_ret, where n is for the target finger. Generator 670 also receives the fn_advance and fn_retard signals and the merge_prot_bypass signal. If finger merge protection is bypassed, then the fn_advance and fn_retard signals for the target finger are provided directly by generator 670 instead of the advance and retard signals from merge detection unit 640. For each active finger, the fn_adv and fn_ret signals from FMP unit 250a are applied at the next update time instant by the finger.

A state machine 660 receives the merge_prot_en, fn_advance, fn_retard, and merge_violation signals and provides the finger_sel signal. Whenever an advance/retard command is issued by controller 160, the state machine is triggered if finger merge protection is enabled. The issuance of the advance/retard command may be indicated by a pulse on the fn_advance or fn_retard signal. The finger merge protection is enabled if the merge_prot_en signal is set to "1". In an embodiment, the state machine includes 13 states—an idle state plus states 0 through 11 for the 12 fingers. Each of states 0 through 11 corresponds to the comparison of the target finger's PN position against the PN position for one of the 12 fingers. The state whereby the target finger is compared against itself is disabled by the check_en signal, and represents an idle cycle. The current state is indicated by the finger_sel signal. States 0 through 11 may be generated with a counter that counts from 0 through 11 and then resets to 0.

The finger_sel signal cycles from state 0 to state 11 so that the 12 fingers can be sequentially considered for possible comparison against the target finger. A comparison may or may not be performed for any given state, depending on the check_en bit for the finger associated with this state. If the merge protection condition is violated for any state (i.e., the absolute difference in PN positions is equal to or less than the merge threshold), then the merge_violation signal is set right away, which then resets the state machine to the idle state. In this case, the advance/retard command is not allowed for the target finger and the advance/retard status for this finger is set to "00" for no change. The state machine would then remain in the idle state and wait for the next advance/retard command from controller 160. Otherwise, if the state machine reaches state 11 and the merge_violation signal is still not set, then the advance/retard command for the target finger is allowed and the advance/retard status for this finger is updated accordingly. After state 11, the state machine transitions to the idle state and waits for the next advance/retard command from the controller.

To simplify the design of FMP unit 250a, state machine 660 includes 12 states for the 12 fingers. However, with 12 fingers, only 11 or fewer comparisons need to be made for each advance/retard command. State machine 660 may be designed to cycle through different number of states than that described above.

The finger merge protection may be performed in various manners. In a first embodiment, the finger merge protection is performed without preference to any active fingers. Each advance/retard command is processed in the order in which it is received, and the command would be allowed by the FMP unit if it determines that applying this command would not the violate the finger merge conditions for any candidate finger.

In a second embodiment, the finger merge protection is performed such that preference is given to some active fingers over others. For example, improved performance may be achieved if the fingers assigned to stronger multipath components are allowed to be updated even if applying the command would violate the finger merge conditions with respect to fingers assigned to weaker multipath components. In that case; the fingers assigned to weaker multipath components may be moved instead.

In one implementation of the second embodiment, a set of "preferred" active fingers is identified based on the signal strength of their multipath components. This signal strength may be computed by a received signal strength indicator (RSSI) based on the received pilot. Each active finger's signal strength may be compared against a signal strength threshold, which may be set such that at any given moment only a particular percentage (e.g., half) of all active fingers are expected to be above the threshold. For example, the signal strength threshold may be set equal to the signal strength of the strongest finger minus 2 dB. Alternatively, a list of active fingers may be identified and a particular percentage of the strongest fingers in this list may be designated as the preferred active fingers. The signal strength may be determined periodically (e.g., every slot in W-CDMA) for the active fingers.

The finger merge protection would then favor the preferred active fingers over non-preferred active fingers. In particular, if applying an advance/retard command for a given preferred active finger would cause it to be too close to another non-preferred active finger, then the advance/retard command would still be applied for the preferred active finger. Another advance/retard command would be applied to the non-preferred active finger so that the finger merge conditions are not violated. If forcing the non-preferred active finger to move causes a finger merge violation with other preferred active finger, then the original advance/retard command may still be allowed anyway. The finger merge conditions may be temporarily violated for the non-preferred candidate finger. If the two preferred fingers continue to move closer together, then the non-preferred finger may eventually be de-assigned.

The second embodiment may also be implemented by FMP unit 250a in FIG. 6. State machine 660 would be provided with the signal strength for the 12 fingers, f0_rssi through f11_rssi. State machine 660 would provide the proper finger_sel signal so that additional comparison may be made if finger merge violation is detected for a preferred target finger with respect to a non-preferred candidate finger. State machine 660 would also provide an override_cmd signal to registers 650 to force the non-preferred candidate finger to move.

The determination of merge violation may be performed in various manners. In one embodiment, there is a merge violation with respect to a candidate finger if all of the following conditions are met:

1. The absolute difference between the current target position and the updated candidate position is less than or equal to the merge threshold, which may be expressed as:

abs(candidate_finger_pos+adv/ret_status−target_finger_pos)≦merge_threshold.

2. The pair_check_en signal is set, which indicates that this finger pair should be checked.
3. The fn_en signal is set, which indicates that the candidate finger currently selected by the state machine is enabled for comparison.
4. The difference between the PN positions for the target and candidate fingers decreases as the result of applying the advance/retard command.

The pair_check_en and fn_en signals may be combined to form the check_en signal as shown in FIG. 6.

FIGS. 7A through 7D graphically illustrate the computation of the difference between the PN positions of the target and candidate fingers. The PN sequence used for scrambling at the transmitter and descrambling at the receiver has a specific data pattern and a fixed length (which is 38,400 chips for W-CDMA). The PN sequence may be viewed as being placed on a circumference 710 of a PN circle, with the start of the PN sequence being aligned to the top of the circle. The circumference is partitioned into 38,400 evenly spaced points, with each point corresponding to a respective PN chip index of the PN sequence. The length of the PN sequence is traversed by moving around the PN circle in a clockwise direction along the circumference.

For some rake receiver designs, a reference counter is maintained and the output value from this counter is used as reference time for the rake receiver. The arrival times for the multipath components may then be given relative to this reference time. The reference counter may be designed to match the PN sequence length (i.e., counts from 0 to 38,399 then wraps back to 0, for W-CDMA) and may further be initialized with any value at power on.

At any given moment, the reference counter value (i.e., the reference count) may be mapped onto the PN circle and the PN chip indices (i.e., the PN counts) for all active fingers may also be mapped onto the PN circle. The PN position for a given finger may be determined by subtracting the finger's PN count from the reference count.

The difference in PN positions for any two fingers may be computed by subtracting their PN positions. However, since these PN positions are determined with respect to the reference count, the comparison needs to take into account the relative locations of the PN counts for the fingers and the reference count on the PN circle.

Figure 7A:
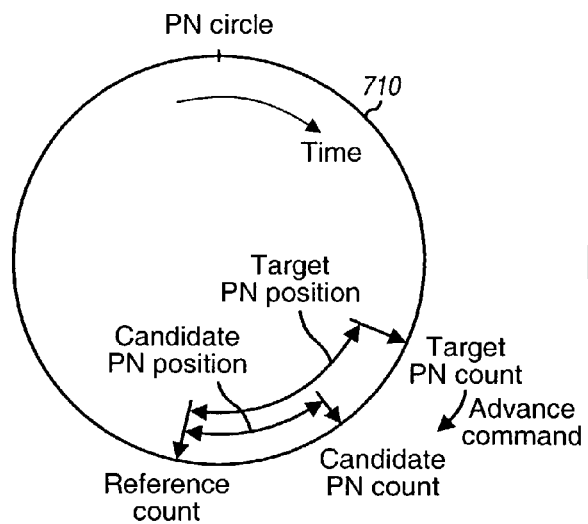
FIGS. 7A through 7D graphically illustrate the computation of the difference between the PN positions of the target and candidate fingers.
Figure 7B:
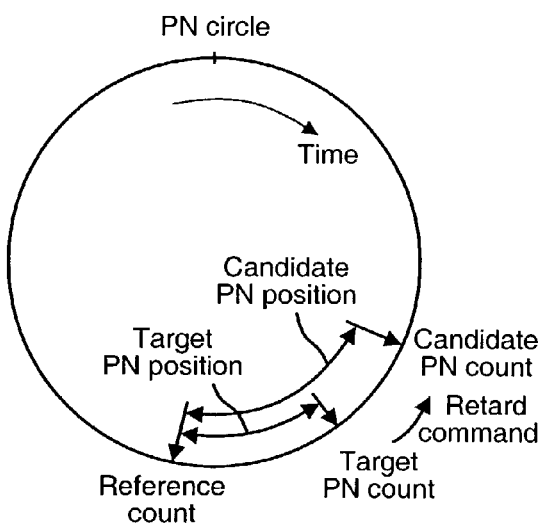

In FIGS. 7A and 7B, the absolute difference between the current target position and the updated candidate position is less than half of the maximum reference count, max_count, which is the last value before the reference counter wraps around. This condition can be expressed as:

abs(candidate_finger_pos+adv/ret_status−target_finger_pos)<max_count/2.

As shown in FIG. 7A, the difference in PN positions decreases if target_finger_pos is greater than (candidate_finger_pos+adv_ret_status) and an advance command was received. And as shown in FIG. 7B, the difference in PN positions also decreases if (candidate_finger_pos+adv_ret_status) is greater than target_finger_pos and a retard command was received.

Figure 7C:
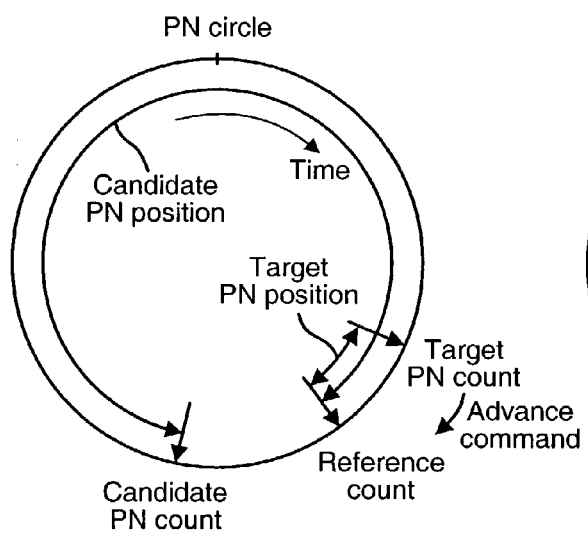
Figure 7D:
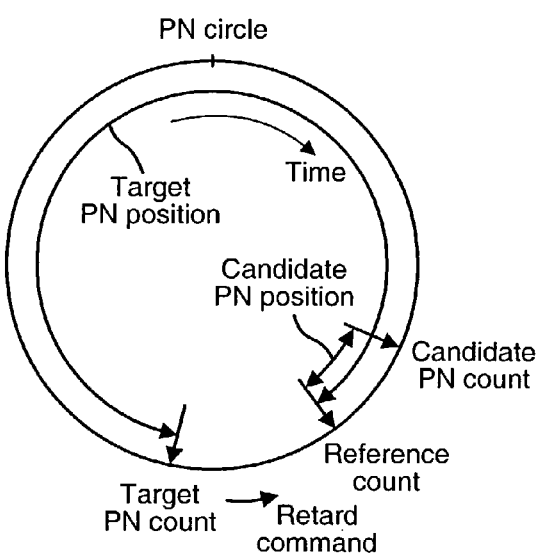

In FIGS. 7C and 7D, the absolute difference between the current target position and the updated candidate position is greater than or equal to half of the maximum reference count. This condition can be expressed as:

abs(candidate_finger_pos+adv_ret_status−target_finger_pos)≧max_count/2.

As shown in FIG. 7C, the difference in PN positions decreases if (candidate_finger_pos+adv_ret_status) is greater than target_finger_pos and an advance command was received. And as shown in FIG. 7D, the difference in positions also decreases if target_finger_pos is greater than (candidate_finger_pos+adv_ret_status) and a retard command was received.

Figure 8:
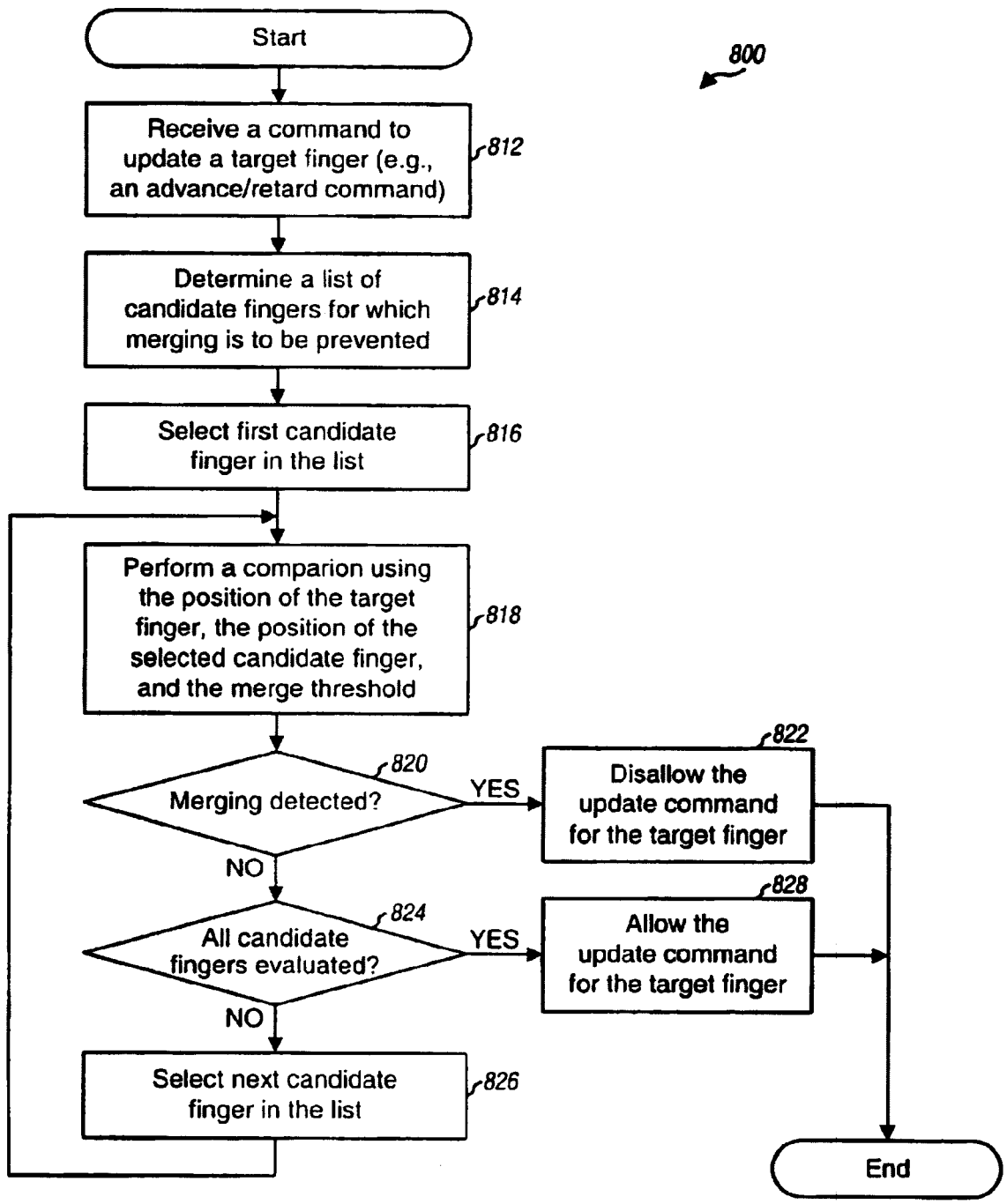
FIG. 8 is a flow diagram of a process for performing finger merge protection.

FIG. 8 is a flow diagram of an embodiment of a process 800 for performing finger merge protection. Initially, an update command is received to adjust a particular target finger (step 812). This update command may be an advance/retard command or some other type of command. A list of candidate fingers for which merging is to be prevented is then determined (step 814).

Detection for merging is then performed for one candidate finger at a time. The first candidate finger in the list is initially selected (step 816). A comparison is then performed using the position of the target finger, the position of the selected candidate finger, and the merge threshold (step 818). The current or updated position for each finger may be used for the comparison, as described above. A determination is then made whether merging is detected for the selected candidate finger based on the comparison result and possibly other information (step 820). If merging is detected, then the update command is disallowed for the target finger (step 822) and the process terminates.

Otherwise, if merging is not detected in step 820 and if all candidate fingers have not been evaluated (as determined in step 824), then the next candidate finger in the list is selected for comparison (step 826) and the process returns to step 818. If all candidate fingers have been evaluated (as determined in step 824) and merging is not detected for all candidate fingers, then the update command is allowed for the target finger (step 828) and the process terminates.

For simplicity, the process shown in FIG. 8 does not perform the additional steps to allow a preferred target finger to be updated even if merging is detected with respect to a non-preferred candidate finger.

For clarity, specific embodiments of the finger merge protection for a specific rake receiver design have been described above. Other embodiments may also be contemplated based on the teachings described herein. For example, multiple comparators may be used to perform the comparison of the fingers' PN positions. Different control signals may also be used than the specific ones described above. Also, different designs may be used for FMP unit 250 than the one shown in FIG. 6.

The finger merge protection techniques described herein may be used to provide improved performance under fat path conditions. In particular, with the finger merge protection, the active fingers may be allowed to come within less than one PN chip apart (e.g., as close as ⅜ or ½ PN chip apart). This then allows more of the signal energy to be collected. The finger merge protection would then ensure that these fingers do not merge together.

The finger merge protection techniques described herein may be used in various wireless communication systems. For example, these techniques may be used in CDMA, time division multiple access (TDMA), frequency division multiple access (FDMA), and other wireless communication systems. These systems may implement one or more applicable standards. For example, the CDMA systems may implement IS-95, IS-2000, IS-856, W-CDMA, and so on. The TDMA systems may implement GSM and so on. These various standards are known in the art.

The techniques described herein may be implemented by various means. For example, the finger merge protection may be implemented in hardware, software, or a combination thereof. For a hardware implementation, various elements used for finger merge protection (e.g., FMP unit 250) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the finger merge protection may be implemented with modules (e.g., procedures, functions, and so on) that perform the functions described herein. For example, some or all of the functions performed by FMP unit 250a in FIG. 6 may be implemented with software modules. The software codes may be stored in a memory unit (e.g., memory 162 in FIGS. 1 and 2) and executed by a processor (e.g., controller 160). This memory unit may be implemented within the processor or external to the processor, in which case it can be communicatively coupled to the processor via various means as is known in the art.

An implementation of the finger merge protection in hardware can simplify a software algorithm used to assign and manage fingers. Conventionally, finger merge protection is implemented in software, if at all. A portion of the processing power of the processor (e.g., controller 160) would then be required to execute the software codes for finger merge protection. This would result in higher power consumption and may further necessitate the need for a faster processor, both of which are undesirable for a mobile application. By implementing the finger merge protection in hardware, these disadvantages can be ameliorated.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device operable to prevent merging of demodulation elements (fingers), comprising:
   a controller operative to identify at least one candidate finger for which merging with a target finger is to be prevented, wherein the at least one candidate finger is identified from among a plurality of fingers assigned to process a plurality of multipath components in a received signal;
   at least one comparator operative to receive and compare a position of the target finger designated to be adjusted with a position of each of the at least one candidate finger; and
   a merge detector operative to determine whether merging is detected for any candidate finger, and wherein the target finger is allowed to be adjusted if merging is not detected for the at least one candidate finger.

2. The device of claim 1, wherein merging is detected based on a difference between the positions of the target and candidate fingers and a merge threshold.

3. The device of claim 2, wherein the merge threshold is less than one PN chip.

4. The device of claim 1, wherein the position of each candidate finger includes an adjustment, if any, allowed to be made to the candidate finger but not yet applied.

5. The device of claim 4, wherein the position of the target finger includes an adjustment proposed to be made for the target finger.

6. The device of claim 1, wherein a set of preferred fingers is identified, and wherein the target finger, if it is a preferred finger, is allowed to be adjusted even if merging is detected for a non-preferred candidate finger.

7. The device of claim 6, wherein the preferred fingers are identified based on signal strength.

8. The device of claim 1, wherein one comparator is used to sequentially compare the position of the target finger with the position of each of the at least one candidate finger.

9. The device of claim 8, wherein the comparison terminates whenever merging is detected for any candidate finger.

10. The device of claim 1, further comprising:
    a set of registers operative to store adjustments allowed for fingers but not yet applied.

11. The device of claim 1, further comprising:
    a state machine operative to provide a signal indicative of which candidate finger to compare with the target finger.

12. The device of claim 11, wherein the state machine sequentially cycles through all possible fingers unless terminated early by merging being detected for a particular candidate finger.

13. The device of claim 1, and operative in an IS-95, CDMA2000, or W-CDMA communication system.

14. The device of claim 1, further comprising:
a decoder operative to receive an indication of the target finger and the at least one candidate finger and to generate a control signal indicating which fingers to compare to prevent merging.

15. The device of claim 1, wherein the at least one candidate finger and the target finger are assigned to process multipath components for a single base station.

16. The device of claim 1, wherein adjustments allowed for fingers are applied are designated time instants.

17. The device of claim 1, further comprising
a plurality of time tracking loops operative to independently track timing of the plurality of fingers, even when merging is detected for any of the fingers.

18. A device operable to prevent merging of demodulation elements (fingers), comprising:
at least one comparator operative to receive and compare a position of a target finger designated to be adjusted with a position of each of at least one candidate finger for which merging is to be prevented, wherein the position of each candidate finger includes an adjustment, if any, allowed to be made to the candidate finger but not yet applied, and wherein the position of the target finger does not include an adjustment proposed to be made for the target finger; and
a merge detector operative to determine whether merging is detected for any candidate finger, wherein the target finger is allowed to be adjusted if merging is not detected for the at least one candidate finger, and wherein merging is detected for a particular candidate finger if both a difference between the positions of the target and candidate fingers is equal to or less than a merge threshold and the difference decreases if the proposed adjustment is allowed for the target finger.

19. In a CDMA communication system, a device operable to prevent merging of demodulation elements (fingers), comprising:
a controller operable to provide commands to adjust positions of a plurality of fingers assigned to process a plurality of multipath components in a received signal and to identify at least one candidate finger for which merging with a target finger is to be prevented, wherein the at least one candidate finger is identified from among the plurality of fingers; and
a finger merge protection (FMP) unit operative to, for each command received from the controller, compare a position of the target finger designated to be adjusted with a position of each of the at least one candidate finger, determine whether merging is detected for any candidate finger based on comparison results, and allow the command for the target finger if merging is not detected for the at least one candidate finger.

20. An apparatus operable to prevent merging of demodulation elements (fingers), comprising:
means for identifying at least one candidate finger for which merging with a target finger is to be prevented, wherein the at least one candidate finger is identified from among a plurality of fingers assigned to process a plurality of multipath components in a received signal;

means for comparing a position of the target finger designated to be adjusted against a position of each of the at least one candidate finger; and
means for determining whether merging is detected for any candidate finger based on comparison results, and wherein the target finger is allowed to be adjusted if merging is not detected for the at least one candidate finger.

21. The apparatus of claim 20, further comprising:
means for identifying a set of preferred fingers, and
wherein the target finger, if it is a preferred finger, is allowed to be adjusted even if merging is detected for a non-preferred candidate finger.

22. An integrated circuit comprising:
a controller operative to identify at least one candidate finger for which merging with a target finger is to be prevented, wherein the at least one candidate finger is identified from among a plurality of fingers assigned to process a plurality of multipath components in a received signal;
at least one comparator operative to receive and compare a position of the target finger designated to be adjusted with a position of each of the at least one candidate finger; and
a merge detector operative to determine whether merging is detected for any candidate finger, and wherein the target finger is allowed to be adjusted if merging is not detected for the at least one candidate finger.

23. The integrated circuit of claim 22, further comprising:
a set of registers operative to store adjustments allowed for fingers but not yet applied.

24. The integrated circuit of claim 22, further comprising:
a state machine operative to provide a signal indicative of which candidate finger to compare with the target finger.

25. A terminal in a wireless communication system, comprising:
a front-end unit operative to process a received signal to provide samples;
a rake receiver including a plurality of demodulation fingers each configurable to process the samples to demodulate a respective multipath component in the received signal;
a controller operative to identify at least one candidate finger for which merging with a target finger is to be prevented, wherein the at least one candidate finger is identified from among the plurality of fingers; and
a finger merge protection (FMP) unit operative to, for each update command, compare a position of the target finger designated to be adjusted with a position of each of the at least one candidate finger, determine whether merging is detected for any candidate finger based on comparison results, and allow the update command for the target finger if merging is not detected for the at least one candidate finger.

26. In a wireless communication system, a method for preventing merging of demodulation elements (fingers), comprising:
identifying at least one candidate finger for which merging with a target finger is to be prevented, wherein the at least one candidate finger is identified from among a plurality of fingers assigned to process a plurality of multipath components in a received signal;

comparing a position of the target finger designated to be adjusted with a position of each of the at least one candidate finger;
determining whether merging is detected for any candidate finger based on comparison results; and
allowing the target finger to be adjusted if merging is not detected for the at least one candidate finger.

27. The method of claim 26, further comprising:
identifying a set of preferred fingers, and
wherein the target finger, if it is a preferred finger, is allowed to be adjusted even if merging is detected for a non-preferred candidate finger.

* * * * *